Figure 1:
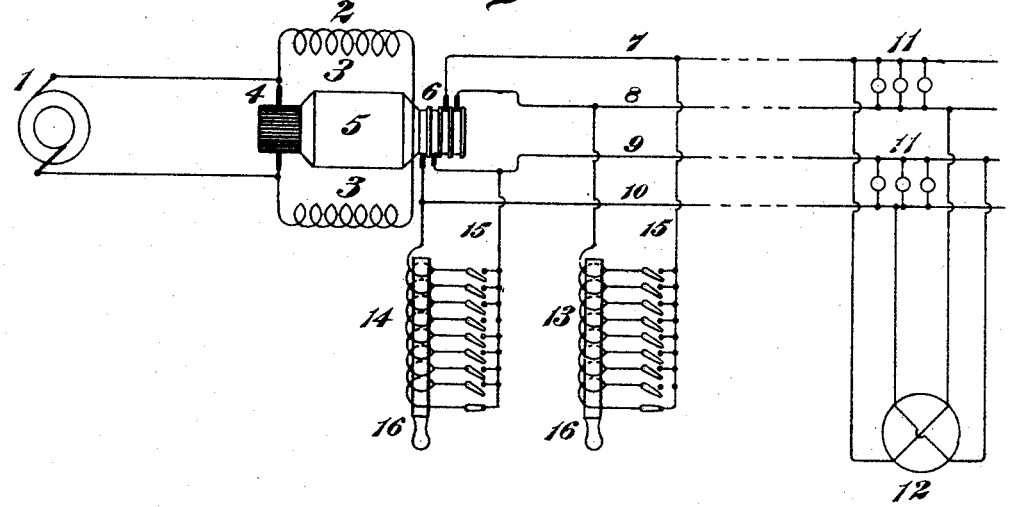

No. 620,336. Patented Feb. 28, 1899.
B. G. LAMME.
SYSTEM OF ELECTRICAL DISTRIBUTION AND REGULATION.
(Application filed Sept. 28, 1898.)
(No Model.)

WITNESSES:
Ethan J. Dodds
H. C. Tener

INVENTOR
Benjamin G. Lamme
BY
Hasley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION AND REGULATION.

SPECIFICATION forming part of Letters Patent No. 620,336, dated February 28, 1899.

Application filed September 28, 1898. Serial No. 692,061. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Electrical Distribution and Regulation, (Case No. 791,) of which the following is a specification.

My invention relates to the transformation of direct current to alternating currents; and it has for its object to regulate or govern the speed of the rotary transformer employed by compensating reactance in the alternating-current circuit.

It is well known that a rotary transformer employed in transforming alternating currents to direct currents has a certain definite speed which is determined by the rate of alternations of the current supplied to its alternating-current terminals. The speed therefore remains constant even though the electromotive force be varied, provided the rate of alternations is not changed. This transformation from alternating currents to direct currents is the one most usually practiced; but it sometimes becomes desirable to make use of motors or other translating devices adapted for operation by alternating currents where the only available source of current is a direct-current generator or a plant embodying several such machines. Under such conditions it becomes necessary in order to utilize the existing plant to transform some or all of the direct current to alternating current. It is of course desirable to employ a rotary transformer for this purpose; but with such reversed operation of the rotary transformer the rate of alternations of the current depends upon the speed of the armature, and this in turn is dependent upon the field-magnet strength and the direct-current electromotive force supplied to the armature. If the rotary transformer is delivering an alternating current that is in step with its electromotive force, the armature reaction due to the direct current is opposed to and practically neutralizes that due to the alternating current. Under this condition the rate of alternations of the alternating current will remain practically constant notwithstanding variations in the load, provided the field charge and the applied direct-current electromotive force remain constant; but if the alternating current is not in step with its electromotive force there will be two components, one of which is in step with the electromotive force and is represented by the direct current supplied by the transformer and the other of which is at right angles to the electromotive force and is not represented by any corresponding direct current. This right-angled component may be either a leading or a lagging current; but under ordinary circumstances it will be of the latter variety and will tend to react upon the field-magnet and demagnetize it, the result being that the speed of the transformer will increase. If the component were a leading current, it would exert a magnetizing effect, and thus strengthen the field-magnet, and the speed of the transformer would increase.

If the alternating-current work-circuit carries an inductive load—such, for example, as induction-motors—which changes from time to time, the variations in the amount of inductive load will obviously cause variations in the speed of the transformer which will in turn vary the speed of the motors constituting the load.

It is the object of my present invention to approximately neutralize this effect of the inductive load, so that the armature reaction and consequently the field-magnet strength will remain substantially uniform whatever may be the amount of load carried by the alternating-current circuit. This I accomplish by the means illustrated in the accompanying drawings, in which—

Figure 2:
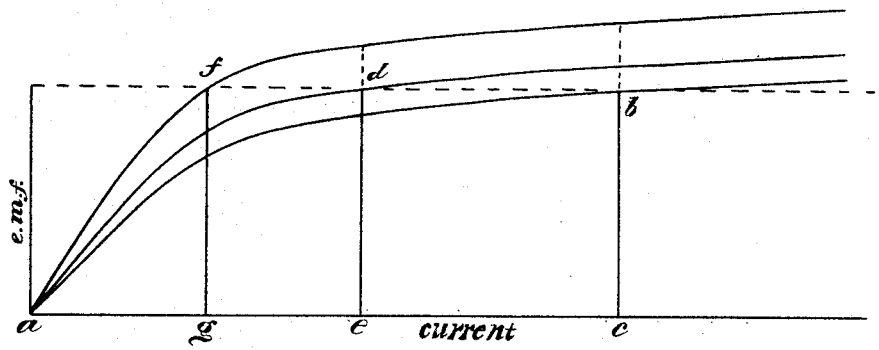

Figure 1 is a diagram of a system of distribution embodying my invention, and Fig. 2 is a diagram illustrating current and magnetic saturation values pertaining to the regulating choke-coils for different rates of alternations and a constant electromotive force.

Referring particularly to Fig. 1, 1 is a direct-current generator, and 2 is a rotary transformer, the field-magnet winding 3 of which is connected in shunt across the brushes of the commutator 4. My invention is not limited, however, to any specific type of field-magnet winding. The winding of the armature 5 is suitably connected at the end opposite the commutator 4 to four collecting-rings 6, so as to supply quarter-phase currents to the circuits 7 8 and 9 10. This number of circuits is, however, merely illustrative, it being immaterial, so far as my invention is concerned, whether the number of phases be more or less than that indicated. The circuits 7 8 and 9 10 are shown as severally supplying single-phase translating devices 11—such, for example, as incandescent lamps—and as jointly supplying a two-phase induction-motor 12. Connected across the circuit 7 8, preferably near the rotary transformer, is a choke-coil 13, and connected across the circuit 9 10 is a similar coil 14, also preferably located near the transformer. Each of these coils is shown as provided with several leads from different portions thereof and with a series of switches 15, corresponding in number to the leads, in order that a greater or less length of the coil may be included in circuit. Each coil is also shown as provided with an adjustable core 16, the self-induction of the coil being capable of variation or adjustment by moving the core longitudinally in the coil. Either or both of these adjusting means may be employed for the purpose of securing the desired degree of reactive effect; but for automatic regulation no manipulation of either of these devices is necessary after the coil has been once adjusted to suit the system of which it forms a part. If non-automatic regulation is desired in any case, however, either the switches or the movable core, or both, may be adjusted by hand for the purpose of regulating or varying the speed of the rotary transformer and consequently that of the motors constituting the load on the work-circuit.

The method of automatic regulation is as follows, it being assumed for the purpose of more logically and clearly setting forth the operation that the choke-coils are connected across the respective circuits 7 8 and 9 10 and that they are adjusted to produce a definite current lag in each of these circuits, such as will result in the desired speed of the rotary transformer, there being either no load on the working circuit or a non-inductive load—such, for example, as the lamps 11. The speed at which the rotary transformer will run under these conditions will be of course determined partially by the effect of the armature reaction due to the lagging current, which results in partially demagnetizing the field-magnets. If, now, an inductive load be added to the work-circuit—such, for example, as the motor 12—such load will create an additional degree of current lag in the circuit, and consequently the speed of the transformer will tend to increase. As the speed increases the rate of alternations will also increase, and with such increase in the rate of alternations the choke-coils 13 and 14 will take less current than with the lower rate and consequently will have less reactive effect upon the line and the rotary transformer. If the choke-coils are properly designed and adjusted, the decrease in the current taken by them at the increased rate of alternations will compensate for the reactive effect due to the motor 12, and the speed of the transformer will consequently drop to substantially what it was prior to the connection of the motor 12 in circuit. As has already been stated, the speed of the transformer and that of the motor or motors may be further regulated by suitable manipulation of the choke-coil-adjusting devices, if desired.

The action of the choke-coils under different rates of alternations is illustrated in Fig. 2, in which the current is measured along the horizontal line from the point $a$ and the electromotive force is measured vertically. Assuming that for a given rate of alternations the electromotive force is represented by the line $c\ b$ and the current taken by the choke-coils is represented by the line $a\ c$, then the saturation curve will be $a\ b$. If the rate of alternations increases, the electromotive force remaining constant, so that the degree of saturation is represented by curve $a\ d$, then the current taken by the coils will fall to the value represented by the line $a\ e$. If the rate of alternations increases without change in the electromotive force, so that the degree of saturation is represented by the curve $a\ f$, the current will fall to the value represented by line $a\ g$.

It will obviously be necessary to properly proportion the choke-coils in order that they may perform the work intended; but this is a matter which can be readily determined by one skilled in the art. It will probably not be possible with this construction and arrangement of apparatus to secure absolutely uniform speed of the rotary transformer under variations in load, but the regulation will be sufficiently close for practical purposes in most cases, and the apparatus involved is so simple and inexpensive that the invention is advantageous and desirable where the employment of more elaborate and expensive apparatus is not feasible.

I claim as my invention—

1. A system of electrical distribution comprising a source of direct currents, a rotary transformer receiving current from said source and supplying alternating currents to translating devices and one or more choke-coils connected across the alternating-current circuit or circuits, said coils being so proportioned as to compensate for changes in inductive load in the work-circuit, whereby the speed of the rotary transformer is kept approximately constant.

2. In a system of electrical distribution, a rotary transformer for transforming direct currents to alternating currents, in combination with an alternating-current work-circuit, and a choke-coil connected to the alternating-current terminal of the transformer, said coil being so proportioned that the variations in the amount of current taken by it due to changes in the rate of alternations will compensate for changes in inductive load in the work-circuit and thereby tend to keep the speed of the transformer constant.

3. The method of governing the speed of a rotary transformer employed for transforming direct currents to alternating currents, which consists in subjecting the armature to the resultant effect of a compensating reactance in the alternating-current circuit whereby the armature reaction is kept approximately constant.

4. The method of governing the speed of a rotary transformer employed for transforming direct currents to alternating currents which consists in subjecting the alternating current or currents to differential or compensating reactive forces so proportioned as to maintain a substantially constant armature reaction in the transformer.

In testimony whereof I have hereunto subscribed my name this 27th day of September, 1898.

BENJ. G. LAMME.

Witnesses:
WESLEY G. CARR,
H. C. TENER.